(12) United States Patent
Caruso

(10) Patent No.: US 6,997,567 B1
(45) Date of Patent: Feb. 14, 2006

(54) VEHICLE MIRROR SYSTEM

(76) Inventor: Jeanine Caruso, 801 Copeland Rd., Odessa, FL (US) 33556

( * ) Notice: Subject to any disclaimer, the term of this patent is extended or adjusted under 35 U.S.C. 154(b) by 0 days.

(21) Appl. No.: 10/961,490

(22) Filed: Oct. 7, 2004

(51) Int. Cl.
*G02B 7/182* (2006.01)

(52) U.S. Cl. .................................... 359/872

(58) Field of Classification Search ........ 359/850–872; 248/490
See application file for complete search history.

(56) References Cited

U.S. PATENT DOCUMENTS

| 6,478,435 B1 * | 11/2002 | Monahan et al. ........... 359/872 |
| 6,779,900 B1 * | 8/2004 | Nolan-Brown .............. 359/871 |
| 6,857,753 B1 * | 2/2005 | Kane .......................... 359/872 |

* cited by examiner

*Primary Examiner*—Euncha P. Cherry
(74) *Attorney, Agent, or Firm*—Edward P. Dutkiewicz

(57) ABSTRACT

A reflective surface has a mount configured to be coupled with vehicle seat back. An attachment member is coupled to the mount and has a hook and loop fastener adapted to couple with a pile-type material on a back surface of the vehicle seat back.

2 Claims, 3 Drawing Sheets

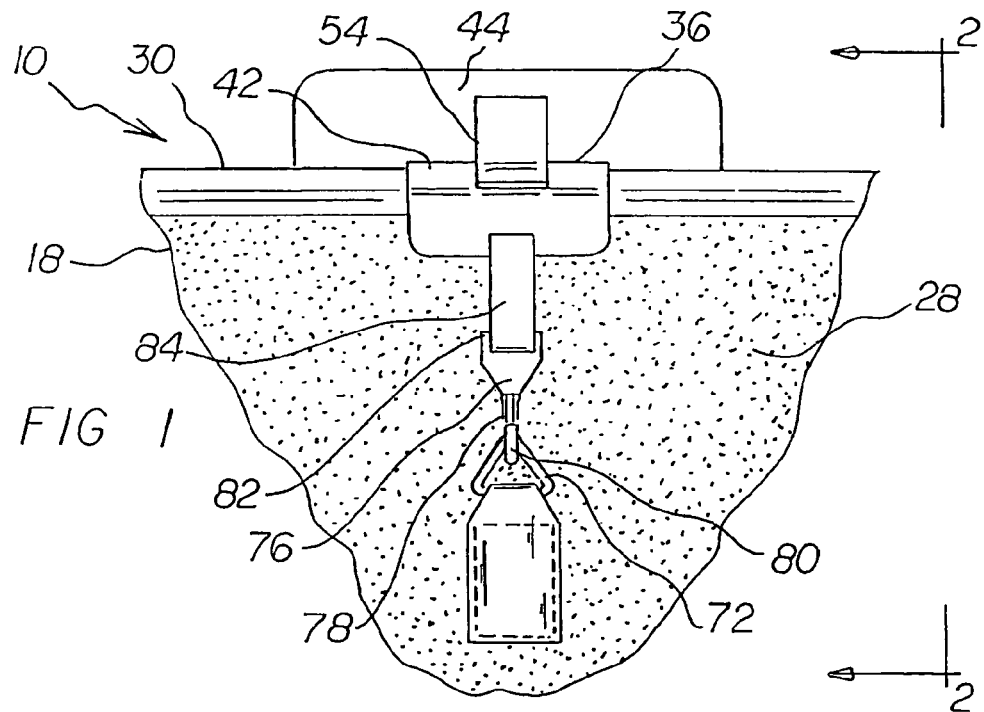
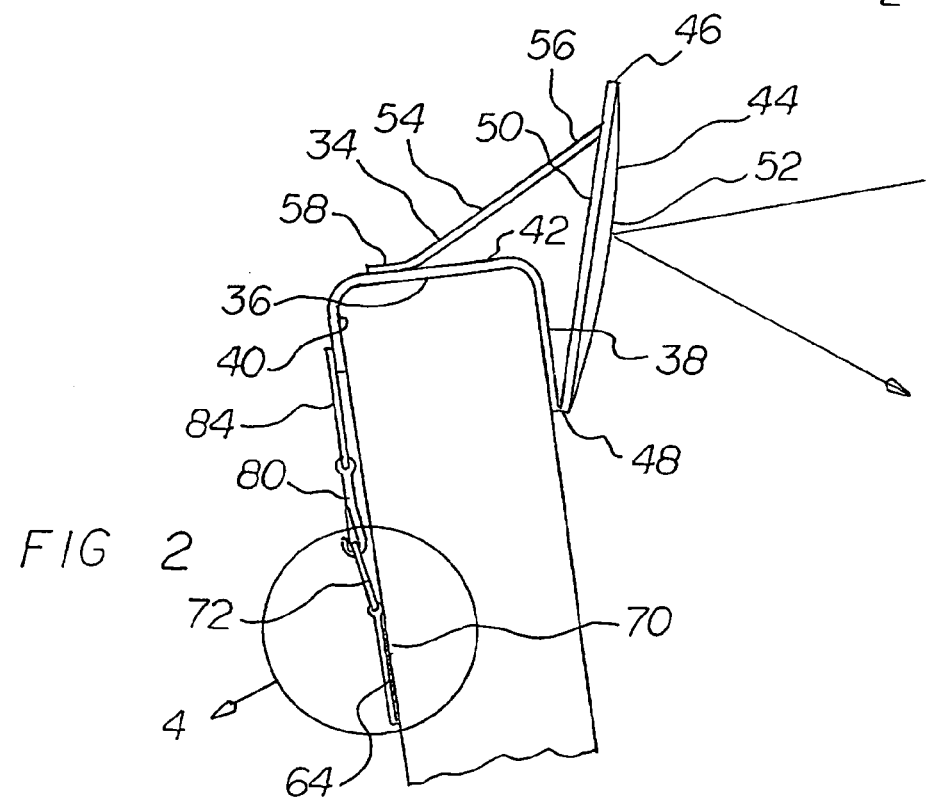

VEHICLE MIRROR SYSTEM

BACKGROUND OF THE INVENTION

1. Field of the Invention

The present invention relates to a vehicle mirror system and more particularly pertains to allowing a driver of a vehicle to safely and conveniently observe an infant in a carrier strapped on the back seat of a vehicle.

2. Description of the Prior Art

The use of vehicle mirror systems of known designs and configurations is known in the prior art. More specifically, vehicle mirror systems of known designs and configurations previously devised and utilized for the purpose of viewing infants in carriers in the back seat of a vehicle are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,702,572 to Cossey discloses a system for viewing an infant in the rear seat of a vehicle. U.S. Pat. No. 4,902,118 to Harris discloses an infant observation mirror for car travel. U.S. Pat. No. 5,285,321 to Nolan-Brown discloses a device for observing infant in rear seat. U.S. Pat. No. 5,668,526 to Collins discloses an infant monitoring system for automobiles. U.S. Pat. No. 6,120,155 to Brennan et al discloses a reflector device and system for viewing the rear seat of a vehicle. U.S. Pat. No. 6,264,340 to Menefee discloses a portable, universal, non-destructive and stable device for viewing an infant in the rear seat of a vehicle. Lastly, U.S. Pat. No. 6,491,403 to Edgar discloses a rear-facing child seat mirror device.

While these devices fulfill their respective, particular objectives and requirements, the aforementioned patents do not describe a vehicle mirror system that allows allowing a driver of a vehicle to safely and conveniently observe an infant in a carrier strapped on the back seat of a vehicle.

In this respect, the vehicle mirror system according to the present invention substantially departs from the conventional concepts and designs of the prior art, and in doing so provides an apparatus primarily developed for the purpose of allowing a driver of a vehicle to safely and conveniently observe an infant in a carrier strapped on the back seat of a vehicle.

Therefore, it can be appreciated that there exists a continuing need for a new and improved vehicle mirror system which can be used for allowing a driver of a vehicle to safely and conveniently observe an infant in a carrier strapped on the back seat of a vehicle. In this regard, the present invention substantially fulfills this need.

SUMMARY OF THE INVENTION

In view of the foregoing disadvantages inherent in the known types of vehicle mirror systems of known designs and configurations now present in the prior art, the present invention provides an improved vehicle mirror system. As such, the general purpose of the present invention, which will be described subsequently in greater detail, is to provide a new and improved vehicle mirror system and method which has all the advantages of the prior art and none of the disadvantages.

To attain this, the present invention essentially comprises a vehicle. The vehicle has a front seat and a back seat. The vehicle also has a rearwardly facing rear view mirror. A generally horizontal extent of the back seat is provided for the support of a carrier strapped thereto with an infant strapped therein. The back seat has a forward face and a rearward face. The back seat has an upward face between the forward face and the rearward face. The rearward face of the back seat is fabricated of a pile-type material.

Next provided is a mirror assembly. The mirror assembly has a primary strap. A forward section is positionable on the forward face of the back seat. A rearward section is positionable on the rearward face of the back seat. An intermediate section is positionable on the upward face of the back seat. The mirror assembly has a supplemental mirror. The supplemental mirror has an upper edge and a lower edge. The lower edge is attached to the forward section of the primary strap. The supplemental mirror has a rear surface. The supplemental rear surface also has a reflective front surface facing the rearview mirror. The reflective front surface is in a convex shape for extended viewing capabilities. The mirror assembly has a secondary strap. A leading edge of the secondary strap is attached to the rear surface of the supplemental mirror adjacent to the upper edge of the supplemental mirror. The mirror assembly also has a trailing edge attached to the intermediate section of the primary strap adjacent to the lower edge of the primary strap. In this manner shifting the mirror assembly forwardly and rearwardly will vary the angle of the supplemental mirror and its reflective surface with respect to the rearview mirror.

Next provided is an attachment member. The attachment member has folded fabric sections in a trapezoidal shaped configuration. A passageway is formed at an upper edge of the attachment member. The attachment member also has a lower free edge. An adhesive secures together the fabric sections. The attachment member also has one surface with a hook and loop fastener removably coupled to the pile-type material of the back seat. The attachment member also has a rigid loop in a triangular configuration. One leg of the triangle is pivotably secured in the passageway of the folded fabric sections and the other two legs of the triangle extend upwardly.

Lastly provided is a clip assembly. The clip assembly has a lower end and an upper end. The lower end of the clip assembly has a clip adapted to removably receive the loop of the attachment member. The clip assembly also has a tertiary strap coupling the rearward section of the primary strap to the upper end of the clip. In this manner a driver on the front seat may look into the rearview mirror and see the reflection of an infant in a carrier on the back seat through the supplemental mirror. The invention is for use in vehicles such as sports utility vehicles and station wagons and other vehicles with back seats having an exposed rearwardly face.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle mirror system which has all of the advantages of the prior art vehicle mirror systems of known designs and configurations and none of the disadvantages.

It is another object of the present invention to provide a new and improved vehicle mirror system which may be easily and efficiently manufactured and marketed.

It is further object of the present invention to provide a new and improved vehicle mirror system which is of durable and reliable constructions.

An even further object of the present invention is to provide a new and improved vehicle mirror system which is susceptible of a low cost of manufacture with regard to both materials and labor, and which accordingly is then susceptible of low prices of sale to the consuming public, thereby making such vehicle mirror system economically available to the buying public.

Even still another object of the present invention is to provide a vehicle mirror system for allowing a driver of a vehicle to safely and conveniently observe an infant in a carrier strapped on the back seat of a vehicle.

Lastly, it is an object of the present invention to provide a new and improved vehicle mirror system comprising a reflective surface having a mount configured to be coupled with a vehicle seat back; and an attachment member coupled to the mount, the attachment member having a hook and loop fastener adapted to couple with a pile-type material on a back surface of the a vehicle seat back.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a rear elevational view of a vehicle mirror system constructed in accordance with the principles of the present invention.

FIG. 2 is a side elevational view of the system taken along line 2—2 of FIG. 1.

The same reference numerals refer to the same parts throughout the various Figures.

DESCRIPTION OF THE PREFERRED EMBODIMENT

Figure 3:
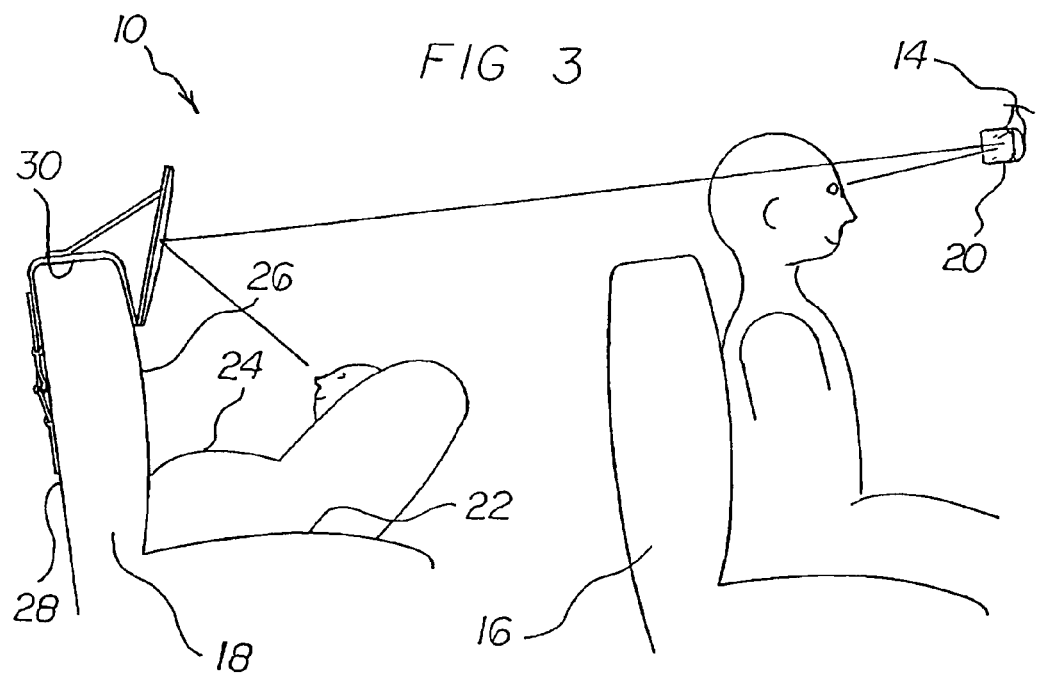
FIG. 3 is a side elevational view of the system shown in the prior figures, the system being removably positioned in a vehicle.
Figure 4:
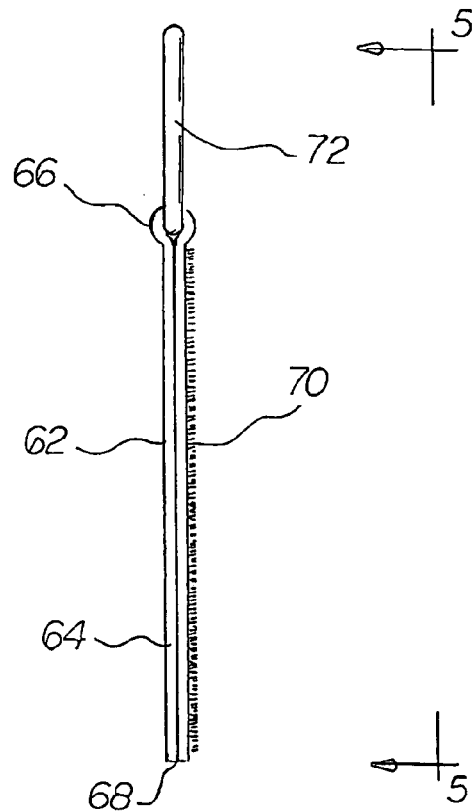
FIG. 4 is an enlarged side elevational view of the attachment member taken at Circle 4 of FIG. 2.
Figure 5:
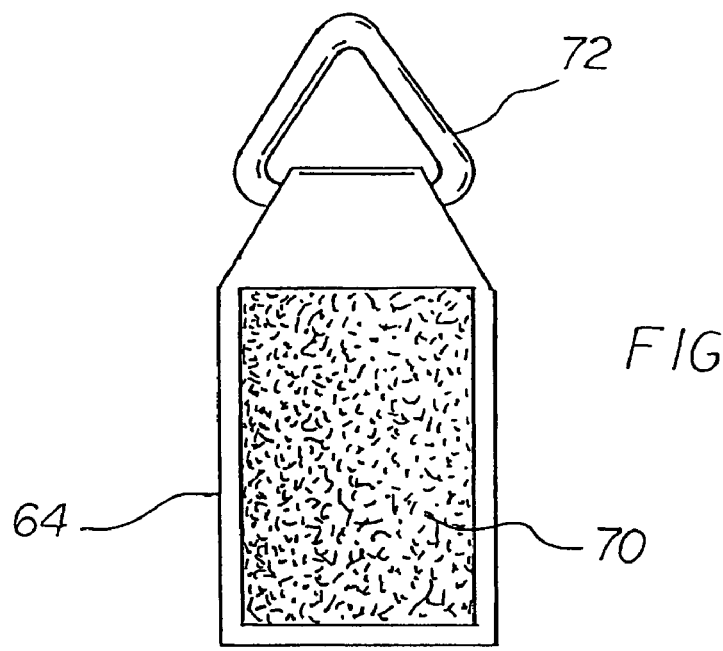
FIG. 5 is a front elevational view of the attachment member taken at Line 5—5 of FIG. 4.

With reference now to the drawings, and in particular to FIG. 1 thereof, the preferred embodiment of the new and improved vehicle mirror system embodying the principles and concepts of the present invention and generally designated by the reference numeral 10 will be described.

The present invention, the vehicle mirror system 10 is comprised of a plurality of components. Such components in their broadest context include a mirror assembly, mirror, and an attachment member. Such components are individually configured and correlated with respect to each other so as to attain the desired objective.

To attain this, the present invention essentially comprises a vehicle 14. The vehicle has a front seat 16 and a back seat 18. The vehicle also has a rearwardly facing rear view mirror 20. A generally horizontal extent 22 of the back seat is provided for the support of a carrier 24 strapped thereto with an infant strapped therein. The back seat has a forward face 26 and a rearward face 28. The back seat has an upward face 30 between the forward face and the rearward face. The rearward face of the back seat is fabricated of a pile-type material, such as a nap fabric or a hook and loop fastener.

Next provided is a mirror assembly 34. The mirror assembly has a primary strap 36. A forward section 38 is positionable on the forward face of the back seat. A rearward section 40 is positionable on the rearward face of the back seat. An intermediate section 42 is positionable on the upward face of the back seat. The mirror assembly has a supplemental mirror 44. The supplemental mirror has an upper edge 46 and a lower edge 48. The lower edge is attached to the forward section of the primary strap. The supplemental mirror has a rear surface 50. The supplemental rear surface also has a reflective front surface 52 facing the rearview mirror. The reflective front surface is in a convex shape for extended viewing capabilities. The mirror assembly has a secondary strap 54. A leading edge 56 of the secondary strap is attached to the rear surface of the supplemental mirror adjacent to the upper edge of the supplemental mirror. The mirror assembly also has a trailing edge 58 attached to the intermediate section of the primary strap adjacent to the lower edge of the primary strap. In this manner shifting the mirror assembly forwardly and rearwardly will vary the angle of the supplemental mirror and its reflective surface with respect to the rearview mirror.

Next provided is an attachment member 62. The attachment member has folded fabric sections 64 in a trapezoidal shaped configuration. A passageway is formed at an upper edge 66 of the attachment member. The attachment member also has a lower free edge 68. An adhesive secures together the fabric sections. The attachment member also has one surface with a hook and loop fastener 70 removably coupled to the pile-type material of the back seat. The attachment member also has a rigid loop 72 in a triangular configuration. One leg of the triangle is pivotably secured in the passageway of the folded fabric sections and the other two legs of the triangle extend upwardly.

Lastly provided is a clip assembly 76. The clip assembly has a lower end 78 and an upper end 82. The lower end of the clip assembly has a clip 80 adapted to removably receive the loop of the attachment member. The clip assembly also has a tertiary strap 84 coupling the rearward section of the primary strap to the upper end of the clip. In this manner a driver on the front seat may look into the rearview mirror and see the reflection of an infant in a carrier on the back seat through the supplemental mirror. The invention is for use in vehicles such as sports utility vehicles and station wagons and other vehicles with back seats having an exposed rearwardly face.

Figure 6:
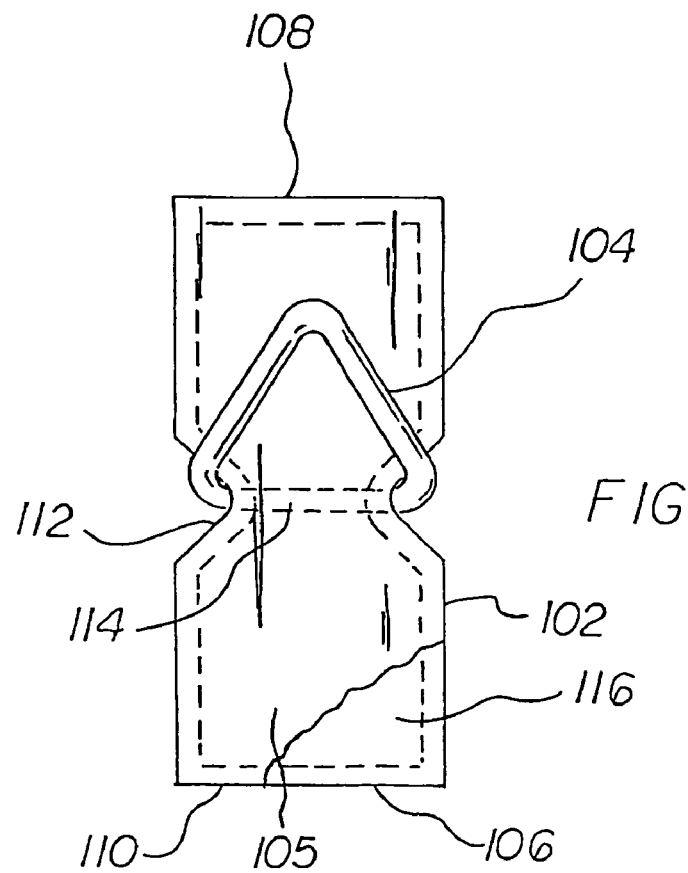
FIG. 6 is a front elevational view of an attachment member constructed in accordance with an alternate embodiment of the invention.

In an alternate embodiment of the invention is shown in FIG. 6. In this embodiment, the attachment member 102 includes a loop 104 and two superposed fabric sections 105 and 106. An upper edge 108 and a lower edge 110 and a central portion 112 are in opposed trapezoidal configurations forming a passageway 114 for a portion of the loop. An adhesive secures together the fabric sections. The attachment member also has one surface supporting the hook and loop fastener 116. The upper and lower edges and the majority of the hook and loop fastener have a width greater than the width at the central portion and passageway for increased coupling between the attachment member and the back surface of the back seat of the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A vehicle mirror system for allowing a driver of a vehicle to safely and conveniently observe an infant in a carrier strapped on the back seat of a vehicle comprising, in combination:

a vehicle having a front seat and a back seat and a rearwardly facing rear view mirror, the back seat having a generally horizontal extent for the support of a carrier strapped thereto with an infant strapped therein, the back seat having a forward face and a rearward face and an upward face therebetween, the rearward face being fabricated of a pile-type material;

a mirror assembly having a primary strap with a forward section positionable on the forward face of the back seat and a rearward section positionable on the rearward face of the back seat and an intermediate section positionable on the upward face of the back seat, the mirror assembly having a supplemental mirror with an upper edge and a lower edge attached to the forward section of the primary strap and with a rear surface and a reflective front surface in a convex shape facing the rearview mirror for extended viewing capabilities, the mirror assembly having a secondary strap with a leading edge attached to the rear surface of the supplemental mirror adjacent to the upper edge and a trailing edge attached to the intermediate section of the primary strap adjacent to the lower edge whereby shifting the mirror assembly forwardly and rearwardly will vary the angle of the supplemental mirror and its reflective surface with respect to the rearview mirror;

an attachment member having folded fabric sections with an upper edge in a trapezoidal shaped configuration forming a passageway and a lower free edge and an adhesive securing together the fabric sections, the attachment member also having one surface with a hook and loop fastener removably coupled to the pile-type material of the back seat, the attachment member also having a rigid loop in a triangular configuration with one leg pivotably secured in the passageway of the folded fabric sections and the other legs extending upwardly; and a clip assembly having a lower end with a clip adapted to removably receive the loop of the attachment member and an upper end, the clip assembly also having a tertiary strap coupling the rearward section of the primary strap to the upper end of the clip whereby a driver on the front seat looking into the rearview mirror sees the reflection of an infant in a carrier on the back seat through the supplemental mirror.

2. A vehicle system comprising:

a reflective surface having a mount configured to be coupled with a vehicle seat back; and an attachment member coupled to the mount, the attachment member being removably attached to the reflective surface mount and having a fixed length with a hook and loop fastener adapted to couple with a pile-type material on a back surface of the vehicle seat back, the attachment member including a continuous ring and a flat portion coupled to the ring thereby allowing the ring to be attached to a seat back using the hook and loop fastener.

* * * * *